US008670448B2

(12) United States Patent
Bedingfield, Sr. et al.

(10) Patent No.: US 8,670,448 B2
(45) Date of Patent: *Mar. 11, 2014

(54) METHODS, SYSTEMS, AND COMPUTER PROGRAM PRODUCTS FOR PROVIDING TRAFFIC CONTROL SERVICES

(75) Inventors: James Carlton Bedingfield, Sr., Lilburn, GA (US); Jeffrey A. Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,208

(22) Filed: Sep. 14, 2012

(65) Prior Publication Data

US 2013/0010596 A1   Jan. 10, 2013

Related U.S. Application Data

(63) Continuation of application No. 11/304,264, filed on Dec. 14, 2005, now Pat. No. 8,306,033.

(60) Provisional application No. 60/667,018, filed on Mar. 31, 2005.

(51) Int. Cl.
*H04L 12/28* (2006.01)

(52) U.S. Cl.
USPC ............... 370/395.21; 370/400; 709/227

(58) Field of Classification Search
USPC ............... 370/395.21, 400; 709/227
See application file for complete search history.

(56) References Cited

U.S. PATENT DOCUMENTS 6,060,994 A * 5/2000 Chen .................. 340/521
8,230,461 B1   7/2012 Ledermann et al.
(Continued)

FOREIGN PATENT DOCUMENTS

WO      03058478       7/2003
WO   2005076617 A1    8/2005

OTHER PUBLICATIONS

"The Cutting Edge of RFID Technology and Application for Manufacturing and Distribution", Texas Instrument TIRIS, Apr. 16, 2004, retrieved from http://www.ti.com/rfid/docs/manuels/whrPapers/manuf_dist.pdf, pp. 1-13.

(Continued)

*Primary Examiner* — Yemane Mesfin
*Assistant Examiner* — Wanda Z Russell
(74) *Attorney, Agent, or Firm* — Cantor Colburn LLP

(57) ABSTRACT

Traffic control services include detecting an occurrence of an activity via a computer processor. The activity subject to the detecting includes a presence of a device. The services also include obtaining traffic management support information associated with a source and destination of the activity. The traffic management support information includes user-defined preferences for controlling traffic to the device. The services further include determining whether the source and the destination supports traffic management activities, and if the source and the destination support the traffic management activities the computer processor subscribes to traffic messages provided by the source and implements traffic management activities for the source and the destination based upon the traffic messages and the user-defined preferences. If the source and the destination do not support the traffic management activities, the computer processor performs default traffic management activities.

17 Claims, 6 Drawing Sheets

(56) References Cited

U.S. PATENT DOCUMENTS

2004/0013119 A1* 1/2004 MeLampy et al. ....... 370/395.21
2004/0125757 A1* 7/2004 Mela et al. .................... 370/261
2006/0013266 A1* 1/2006 Vega-Garcia et al. ........ 370/535
2006/0034335 A1 2/2006 Karaoguz et al.
2006/0144706 A1 7/2006 Adourian et al.

OTHER PUBLICATIONS

"Baggage Direct-Uses Tag-It, The World's First RFID-based Baggage Delivery System", Nov. 2000, Texas Instruments, 12 pages.

* cited by examiner

METHODS, SYSTEMS, AND COMPUTER PROGRAM PRODUCTS FOR PROVIDING TRAFFIC CONTROL SERVICES

CROSS-REFERENCE TO RELATED APPLICATIONS

This application is a continuation application of U.S. application Ser. No. 11/304,264 filed on Dec. 14, 2005. Application Ser. No. 11/304,264 claims priority to U.S. Provisional Application No. 60/667,018, filed on Mar. 31, 2005, the contents of which are incorporated by reference herein in its entirety. This application is related to commonly assigned U.S. Pat. No. 7,975,283. This application is also related to commonly assigned U.S. Pat. No. 8,258,861. This application is also related to commonly assigned U.S. Pat. No. 8,024,438. This application is further related to commonly assigned U.S. patent application Ser. No. 11/300,061. This application is also related to commonly assigned U.S. Pat. No. 8,098,582. These applications and patents are incorporated by reference herein in their entireties.

BACKGROUND

The present invention relates generally to communications services, and more particularly, to methods, systems, and computer program products for providing traffic control services.

Digital Subscriber Line (DSL) technology is a copper loop transmission technology that provides increased bandwidth in the last mile between communication service providers and the users of these services. DSL technology provides broadband speed over a conventional phone wire, which in turn, allows service providers to provide multimedia applications, e.g., video, VoIP (Voice over Internet Protocol), Internet, etc., to their customers over their existing outside plant infrastructure.

Various services (e.g., television services), however, typically consume large amounts of bandwidth on a DSL connection. When multiple services (e.g., television, video/music downloading, gaming, etc.) are simultaneously utilized for a single account (e.g., household), the overall quality of these services can be negatively impacted due to strain on the available bandwidth (e.g., transmission delays or dropped packets), resulting in loss of quality, such as reduced VoIP voice quality. Customers may have some rudimentary knowledge of these issues and attempt to troubleshoot by activating and deactivating various services. However, they may not be able to resolve the issues unless they are given specific information about the nature of the issues and suggested courses of action for correcting the issues, and even then the complexities associated with potential solutions may be overwhelming to the user/customer. Further, the customer may not have direct control over various aspects of resources or the network which could be used to resolve or minimize such problems, such as packet priority, or other session flow control parameters.

What is needed, therefore, is a way to control aspects of one or more services and/or resources and/or the communications network such that appropriate quality levels are maintained for the various services/sessions/users.

BRIEF SUMMARY

Exemplary embodiments include a method for providing traffic control services. The method includes detecting an occurrence of an activity via a computer processor. The activity subject to the detecting includes a presence of a device. The method also includes obtaining traffic management support information associated with a source of the activity and a destination of the activity. The traffic management support information includes user-defined preferences for controlling traffic to the device. The method further includes determining whether the source and the destination supports traffic management activities and, if the source and the destination support the traffic management activities, the method includes subscribing to traffic messages provided by the source and implementing traffic management activities for the source and the destination based upon the traffic messages and the user-defined preferences. If the source and the destination do not support the traffic management activities, the method includes performing default traffic management activities via the computer processor. The method also includes reporting a status of the device Additional embodiments include a system for providing traffic control services. The system includes a controller including a computer processor and computer logic executing on the computer processor for performing a method. The method includes detecting an occurrence of an activity via a computer processor. The activity subject to the detecting includes a presence of a device. The method also includes obtaining traffic management support information associated with a source of the activity and a destination of the activity. The traffic management support information includes user-defined preferences for controlling traffic to the device. The method further includes determining whether the source and the destination supports traffic management activities and, if the source and the destination support the traffic management activities, the method includes subscribing to traffic messages provided by the source and implementing traffic management activities for the source and the destination based upon the traffic messages and the user-defined preferences. If the source and the destination do not support the traffic management activities, the method includes performing default traffic management activities via the computer processor. The method also includes reporting a status of the device.

Further embodiments include a tangible computer-readable storage medium for providing traffic control services. The computer-readable medium is encoded with computer executable code to perform a method. The method includes detecting an occurrence of an activity via a computer processor. The activity subject to the detecting includes a presence of a device. The method also includes obtaining traffic management support information associated with a source of the activity and a destination of the activity. The traffic management support information includes user-defined preferences for controlling traffic to the device. The method further includes determining whether the source and the destination supports traffic management activities and, if the source and the destination support the traffic management activities, the method includes subscribing to traffic messages provided by the source and implementing traffic management activities for the source and the destination based upon the traffic messages and the user-defined preferences. If the source and the destination do not support the traffic management activities, the method includes performing default traffic management activities via the computer processor. The method also includes reporting a status of the device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

In accordance with exemplary embodiments, a traffic control system for providing traffic management services is provided. The traffic control system enables various types of users, e.g., personal consumers, network providers, and content providers to manage the transfer of data for a variety of devices, applications, and content types. The traffic management services may be implemented between a controller and one or more networks, devices, and sessions.

Figure 1:
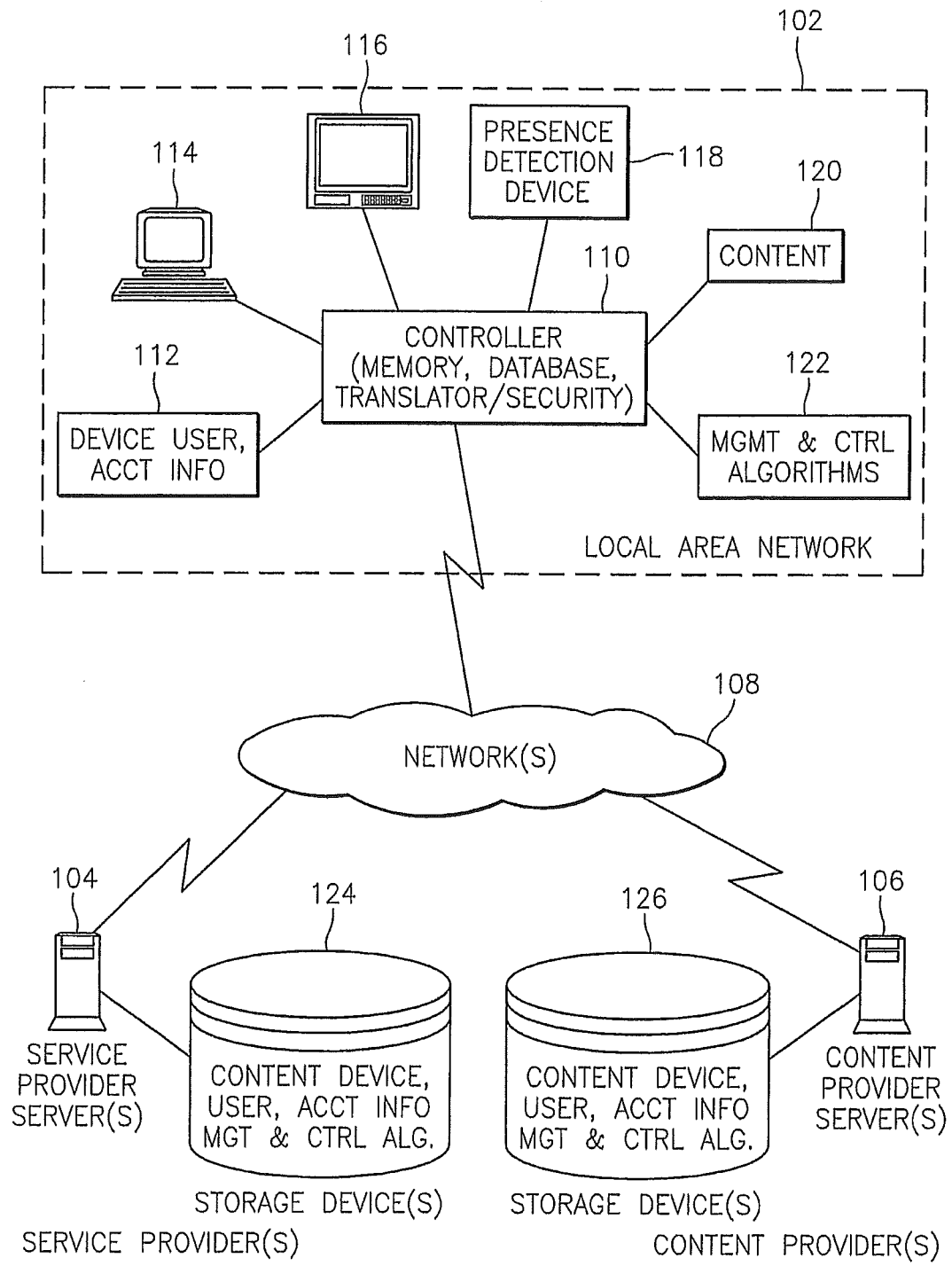
FIG. 1 is a traffic control system upon which the traffic management services may be implemented in exemplary embodiments.

Turning now to FIG. 1, a network system upon which the traffic management services may be implemented will now be described. In exemplary embodiments, the system of FIG. 1 includes a customer premises 102 in communication with a service provider via server(s) 104 and a content provider via server(s) 106 over one or more networks (e.g., network 108). The service provider server 104 may be implemented by, e.g., a provider of DSL services, which provides service sessions to its customers (e.g., customer premises 102) via network 108, which services are further distributed to the appropriate devices therein.

Content provider server 106 may be implemented by a commercial entity, e.g., television network, music company, publishing company, etc., that provides content to its customers (e.g., customer premises 102) via network 108. In alternative exemplary embodiments, a content provider may be a non-commercial entity such as a user system located at another customer premises. In this alternative embodiment, the user system (e.g., consumer device) may provide content via a personal computer, personal digital assistant, cellphone, etc., in lieu of the server 106. Examples of content may include television programming, text files, music files, video, multi-media content, etc.

Each of the servers 104, 106 may be implemented using one or more processors operating in response to a computer program stored in a storage medium accessible by the servers. The servers may operate as network servers (e.g., a web server) to communicate with one or more communications elements such as devices 114-118 at customer premises 102. The servers 104, 106 handle sending and receiving information to and from one or more of the communications elements and can perform associated tasks.

Each of the servers 104, 106 may also operate as an application server. For example, service provider server 104 may execute one or more computer programs to implement digital subscriber line (DSL) services to its customers, as well as other processes and related functions. Likewise, content provider server 106 may execute one or more computer programs to provide content to receiving devices (e.g., devices 114, 116, server 104, etc.).

As shown in the system of FIG. 1, service provider server 104 is in communication with a storage device 124, and content provider server 106 is in communication with a storage device 126. It will be understood by those skilled in the art that service provider server 104 and content provider server 106 may each be in direct communication with respective storage devices 124, 126 via, e.g., wireline or wireless technologies, etc. Alternatively, each of storage devices 124, 126 may be implemented using memory contained in respective servers 104, 106. Storage devices 124, 126 may be implemented using a variety of devices for storing electronic information. The storage devices 124, 126 may be logically addressable as a consolidated data source across a distributed environment that includes, e.g., network 108. Information stored in the storage devices 124, 126 may be retrieved and manipulated via the respective servers 104, 106.

Each of the storage devices 124, 126 includes a data repository that stores, e.g., one or more of content; device, user, and account information; management and control algorithms, etc. As indicated above, content stored by content provider server 106 may include television programming, text files, music files, video, electronic gaming data/content, multi-media content, etc. In alternative exemplary embodiments, some of the content provided by the content provider entity or other source of content may be stored by the service provider entity in storage device 124 via, e.g., personal video recorders (PVRs), allowing a customer premises (e.g., 102) in close proximity to the service provider to download the content. By storing the content closer to the customer premises 102, a reduction in the amount of bandwidth consumed upstream from the customer premises 102 may be minimized. In further exemplary embodiments, a second customer premises (not shown) may be implemented in the system of FIG. 1 that includes a PVR for communicating with customer premises 102 to share content stored on their respective PVRs via, e.g., a peer-to-peer network.

Network 108 may be any type of known network including, but not limited to, a Wide Area Network (WAN), a global network (e.g., Internet), or other network configuration known in the art. These networks may be implemented using a wireless network or may be physically connected to each other in a state of the art configuration. Further, the network 108 may include wireless or wireline connections, radio-based communications, telephony based communications, optical communications, and other network-based communications. In addition, network 108 and/or the service provider entity may include monitoring equipment (not shown) for tracking and routing the flow of data through communications elements (e.g., devices 114, 116, servers 104, 106, etc.).

Customer premises 102 may comprise, e.g., a residential entity or business establishment. Customer premises 102 includes various devices that utilize communication services provided by a service provider (e.g., service provider server 104) via one or more networks 108. These devices, in turn, may communicate with one another via, e.g., a local area network (LAN). The LAN may be wireline, wireless, or a combination thereof. Devices residing in the LAN of customer premises 102 may include, e.g., one or more computer systems (e.g., device 114), one or more televisions (e.g., device 116), one or more presence detection devices 118, one or more personal video recorders (PVRs) (not shown), one or more telephony devices (not shown), and one or more applications (e.g., video chat, file download, video conferencing, interactive gaming, multi-media applications, etc.) executing on the aforementioned devices, to name a few.

Computer system 114 may comprise a personal computer, laptop, or other similar type of processing device. Computer system 114 may implement a variety of network-enabled applications, such as Internet gaming, interactive applications, video chat, graphical/pictorial applications, encryption tools, interactive multi-media applications, multi-media content, etc. Television device 116 may include a standard broadcast, cable, and/or premium channel-viewing device. Television device 116 may also comprise network elements that support, e.g., Web TV. In addition, television device 116 may include peripheral components, such as a set top box, remote control, PVR, or other suitable elements. The PVR may be used to record video and/or audio content that is downloaded from the service provider and/or content provider through the network 108. It will be understood that any of these components may provide computing functions or operations. Telephony devices may comprise a wireline telephone, a cellular telephone, SIP (Session Initiation Protocol) or VoIP telephone, or other suitable voice communications device. Further, telephony devices may implement multi-media applications such as video/text messaging and related functions.

Presence detection device 118 identifies the presence of an individual, other living object, and/or devices (e.g., devices 114 and 116, etc.) in customer premises 102 and communicates the presence to a controller 110, which is also included in the customer premises 102. Presence detection device 118 may also detect the presence of a network (e.g., via a BlueTooth® device detection, etc.). Alternatively, the controller 110 may be configured to detect the presence of one or more of these items (objects, devices, networks, etc.). Presence detection device 118 may comprise one or more sensors (e.g., camera, bio-scanner, heat sensor, motion sensor, BlueTooth® device, any other types of sensors, e.g., RFID sensor, etc.), which communicate the detection to controller 110.

Customer premises 102 also includes device, user, and account information 112. The device, user, and account information may be stored in one or more of devices 114, 116, and other systems that contain memory. Customer premises 102 also includes management and control algorithms 122. The management and control algorithms may be stored in one or more of devices 114, 116, and other items in customer premises 102 that contain memory. The controller 110 accesses device, user, account information 112, as well as management and control algorithms 122 as will be described further herein.

Customer premises 102 may also include content 120. Content 120 may be programming downloaded from one or both of storage devices 124 and 126 and stored, e.g., on a set top box in communication with television device 116. The content 120 may alternatively include video and/or audio content stored on one or more of devices 114, 116, or other device in communication with controller 110.

It will be understood that all or a portion of the content 120, device, user, and account information 112, and management and control algorithms 122 may be distributed over network 108 and stored on one or both of storage devices 124 and 126.

The controller 110 of customer premises 102 may serve as a gateway, e.g., residential gateway (RG) and, optionally, a routing device to allow one or more of devices 114, 116 to communicate via an interface. The residential gateway may also be used to provide a firewall to inhibit viruses or other system attacks from affecting the devices in the customer premises 102.

If the services provided by service provider server 104 comprise DSL services, the residential gateway of customer premises 102 may communicate with network 108 via, e.g., a digital subscriber line access multiplexor (DSLAM) (not shown). The DSLAM concentrates traffic from multiple DSL loops onto a backbone network, which is part of the network 108. The DSLAM may, in some embodiments, operate on packets, frames, and/or messages passing therethrough. For example, to support dynamic IP address assignment, the DSLAM may inspect the IP address of packets to direct the packets to their proper destination.

In exemplary embodiments, controller 110 is in communication with service provider server 104 and content provider server 106 via network 108 and is also in communication with devices 114-118. Controller 110 implements traffic management services for each separate session present on a connection at the LAN of customer premises 102. In exemplary embodiments, controller 110 includes a processor, memory, and logic. Controller 110 receives and executes instructions for controlling content on devices in the LAN of customer premises 102. Controller 110 also receives input information (e.g., presence detection signals, user IDs, etc.) from devices 114-118 and relays this information to an appropriate location or destination as described further herein.

Controller 110 may be a stand-alone device or may be incorporated into a residential gateway, modem, device, etc. In accordance with exemplary embodiments, the functionality of controller 110 may be implemented outside of the LAN of customer premises 102, such as in software or hardware elements under the management of one or more external entities, such as a service provider, content provider, etc.

Controller 110 facilitates traffic management and control by receiving instructions/messages from one or more devices, users, networks, and/or sessions. This may be implemented by identifying devices, applications, networks, etc. that are capable of participating in traffic management activities and distributing and/or exchanging relevant information (e.g., capabilities, instructions, etc.) from these devices, applications, networks, etc., in furtherance of performing traffic control.

Traffic control activities may include, e.g., monitoring network sessions occurring over a connection, notifying relevant entities of specified traffic-related issues, and modifying the distribution of traffic for one or more of these sessions based upon various criteria.

For example, in response to monitoring traffic across a connection, traffic flow issues may be determined that trigger notifications to device, users, etc., based upon user- and/or network-defined criteria. These elements may be implemented via proprietary systems, or may be implemented via the Bandwidth Management System disclosed in co-pending, commonly assigned patent application Ser. No. 11/304,422 entitled, METHODS, SYSTEMS, AND COMPUTER PRO- GRAM PRODUCTS FOR IMPLEMENTING BANDWIDTH MANAGEMENT SERVICES, filed on Dec. 14, 2005, the contents of which are incorporated by reference herein in its entirety. The Bandwidth Management System discloses a process for monitoring traffic and traffic types transiting a network connection, analyzing the traffic measurements, determining approximately when, and in what manner, simultaneously provided services (e.g., services provided over multiple simultaneous service sessions) are likely to interfere with or otherwise impact each other, and notifying those affected of these conditions so that those affected may take corrective actions.

The determination of these issues are made, e.g., using appropriate rules and algorithms to test various single measurements, and/or combinations of measurements, and/or calculated values based on such measurement inputs and/or determinations based on such measurement inputs against thresholds and/or other suitable criteria. Alternatively or additionally, the determination may be based upon associated notification capabilities (e.g., device capabilities and selected preferences).

Modifications to the distribution of traffic may be implemented via proprietary systems or may be implemented via the Bandwidth Control System disclosed in a co-pending, commonly assigned application, Ser. No. 11/304,330, METHODS, SYSTEMS, AND COMPUTER PROGRAM PRODUCTS FOR IMPLEMENTING BANDWIDTH CONTROL SERVICES, filed on Dec. 14, 2005, the contents of which are incorporate by reference herein in its entirety. The Bandwidth Control System discloses a system for monitoring traffic and traffic types transiting a network connection, analyzing the traffic measurements, determining approximately when, and in what manner, simultaneously provided services (e.g., services provided over multiple simultaneous data sessions) are likely to interfere with, or otherwise impact each other, and to automatically adjust traffic policing or shaping or other control mechanisms in the network and/or to automatically adjust service parameters such as the level and timing of device/application requests or service/server responses or other service-related activity so as to correct the problem or avoid its occurrence, and further to automatically determine and implement the best coordinated combination of control via the above.

The bandwidth control system further enables customers to set bandwidth priorities according to a set of rules, e.g., scheduling certain days/times for high bandwidth service and other days/times for low bandwidth service.

Modifications to the distribution of traffic may also be implemented according to device characteristics as disclosed in co-pending, commonly assigned application, Ser. No. 11/300,061 entitled, METHODS, SYSTEMS, AND DEVICES FOR BANDWIDTH CONSERVATION, filed on Dec. 14, 2005, the contents of which are incorporate by reference herein in its entirety.

Alternatively, modifications to the distribution of traffic may also be implemented according to presence detection (e.g., detecting the presence of a device, a user of a device, an application executing on a device, a network presence, or a lack thereof, etc.) as disclosed in co-pending, commonly assigned application, Ser. No. 11/300,125, entitled PRESENCE DETECTION IN A BANDWIDTH MANAGEMENT SYSTEM, filed on Dec. 14, 2005, the contents of which are incorporated by reference herein in its entirety. For example, a screen-saver mode may be implemented such that if a viewer has not operated a remote for a device (e.g., 114, 116) within a specified time period, the current programming on the device is paused and the device transitions into a low bandwidth screensaver mode, along with a corresponding reduction in bandwidth utilization across the serving network(s).

The controller 110 facilitates these and other processes as described further herein.

In alternative exemplary embodiments, the system of FIG. 1 may include multiple competing or co-existing service provider entities and/or content provider entities that participate in the traffic control system. For example, traffic management services may be implemented for consumers irrespective of which service provider they choose for receiving network services, whereby controller 110 provides the functionality for communicating with these different provider entities. In this alternative exemplary embodiment, controller 110 may further include a translator component and a security component. The translator component enables the controller 110 to interoperate with different systems/algorithms regardless of which service provider provides network services to a consumer. Also, the translator component may be configured such that it is able to communicate with other controllers (e.g., those produced by different manufacturers) in order to convert between different data formats and/or structures and/or usages, etc. The functionality of the translator component may be implemented, e.g., via a database residing within the controller 110 that contains translation rules or parameters for these other systems. The controller 110 then queries the database for information regarding the other system or controller.

In addition, the controller 110 may include a coordination function via its internal logic that enables it to exchange information with other controllers and coordinate a determination of preferred or optimal actions to take based upon, e.g., network, bandwidth, and/or financial constraints. Also, the coordination function may be configured to cooperatively act with other traffic control systems so as to achieve a shared solution for obtaining the traffic control objectives.

The controller 110 may also include a security component that includes rules for ensuring that the controller 110 is protected from any attempts to cause harm by providing bad inputs (e.g., a hacker may have comprised one of the other systems, then subsequently attempts to trick or harm the controller 110 by sending it information crafted to cause harm or cause the controller to crash or infect other systems).

Figure 2:
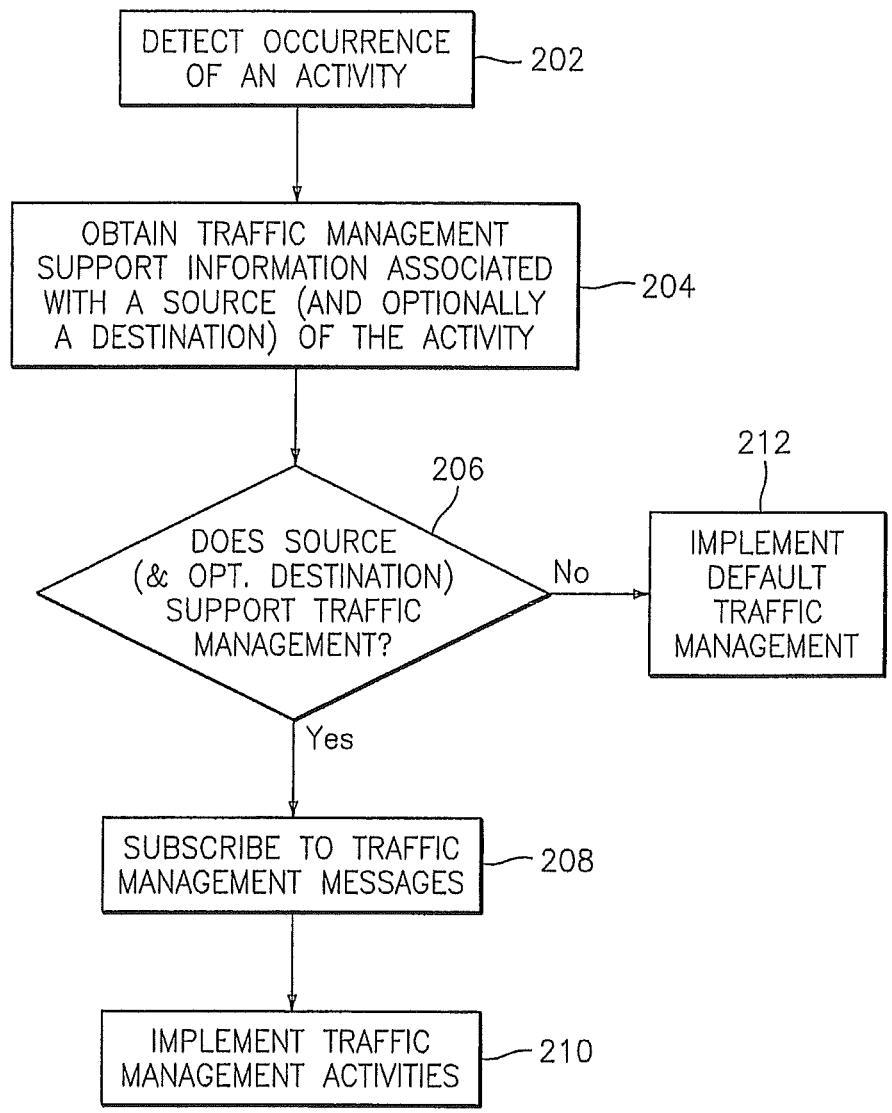
FIG. 2 is a flow diagram describing a process for establishing and maintaining the traffic control system of FIG. 1 in exemplary embodiments.

As indicated above, the traffic management services may be implemented between a controller and one or more networks, devices (and device users), and sessions. Turning now to FIG. 2, a process for establishing and maintaining the traffic control system in accordance with exemplary embodiments will now be described. At step 202, the occurrence of an activity is detected by the controller 110. The activity may originate from a network (e.g., network 108, the LAN of customer premises 102, etc.), a device (e.g., devices 114-118, an application executing on one of devices 114-118), a living object (e.g., a user of one of devices 114-118, an individual or pet that is present in customer premises 102, etc.), or a communications session (e.g., device powered up, login process, network session, etc.). The controller 110 detects this activity and seeks traffic management support information associated with the source of the activity (and optionally, a destination of the activity) at step 204. The traffic management support information may include device, user account information stored in 112 or storage devices 124, 126, as well as management and control algorithms stored in 122 and/or storage devices 124, 126. The device, user, and account information may include user-defined preferences for controlling traffic to devices as described in co-pending applications, Ser. No. 11/304,330 and/or Ser. No. 11/304,422, referenced above. The management and control algorithms may include rules for handling traffic flow and traffic-related issues as described in co-pending applications, Ser. No. 11/304,330 and/or Ser. No. 11/304,422, referenced above.

At step 206, it is determined whether the source (and optionally, the destination) supports traffic management services, such as those provided by the traffic control system and/or one or more of the tools disclosed in the aforementioned co-pending applications. If so, the controller 110 subscribes to traffic management messages at step 208. The controller 110 communicates its existence and its capabilities to exchange traffic management messages from other systems and devices. At step 210, the traffic management activities are implemented in accordance with the subscription messages. The traffic management activities may include one or more of the processes disclosed in the aforementioned co-pending applications. On the other hand, if the source does not support traffic management activities, then the controller 110 implements default traffic management at step 212. Default traffic management may comprise existing gateway/routing functions (e.g., receiving incoming traffic and distributing the traffic to the appropriate device).

Figure 3:
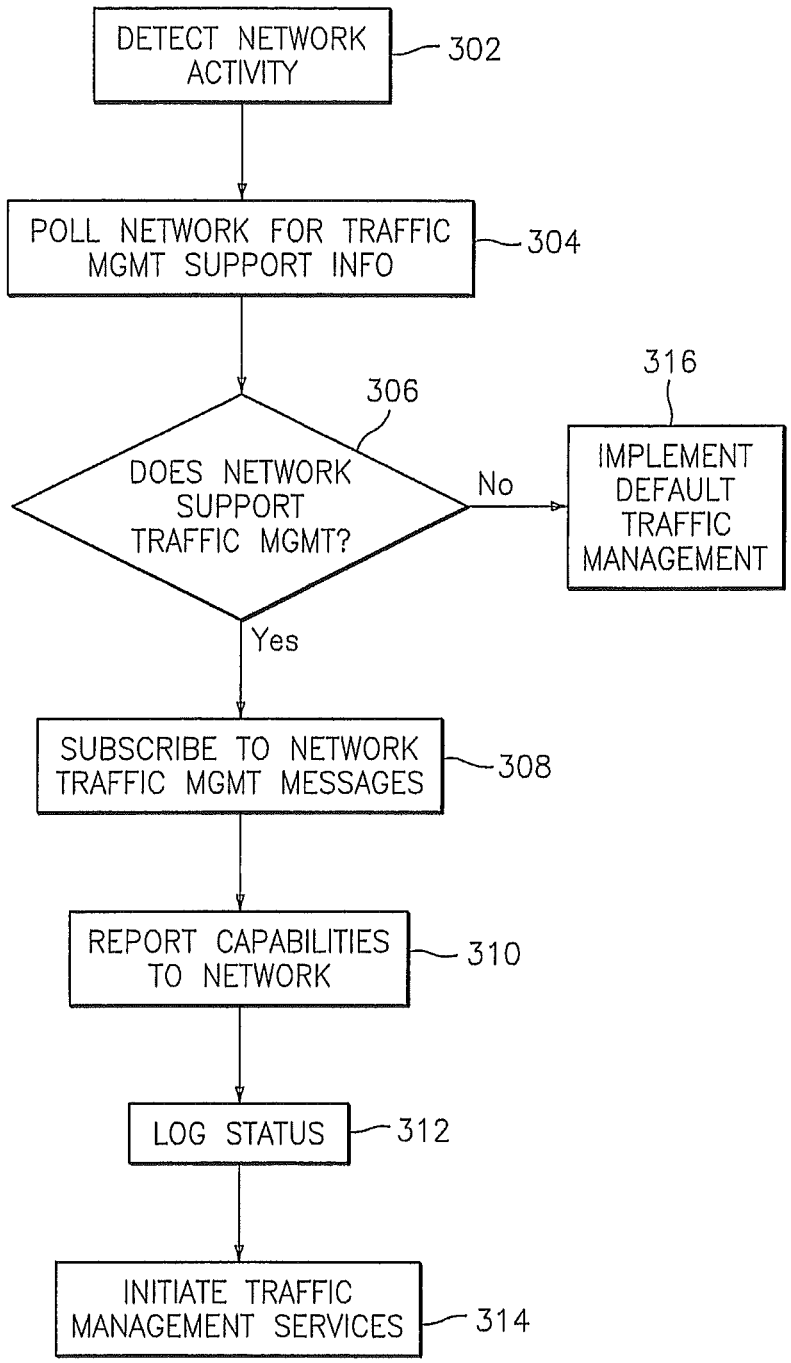
FIG. 3 is a flow diagram describing a process for establishing and maintaining the traffic control system of FIGS. 1 and 2 with respect to a controller and an external network in exemplary embodiments.

The flow diagrams of FIGS. 3-6 expand on the traffic control system functions described in FIG. 2, based upon the source and/or destination of the activity, as will now be described in accordance with exemplary embodiments. Turning now to FIG. 3, a process for establishing and maintaining the traffic control system with respect to a controller and a network will now be described. At step 302, a network activity (e.g., network 108, LAN of customer premises 102, etc.) is detected by the controller 110. The activity may be as simple as detecting the network's presence (e.g., a signal transmitted via a LAN router operating in conjunction with a personal computer, such as device 114, which is then transmitted to, or is otherwise detected by, the controller 110; or via presence detection device 118 using, e.g., Bluetooth® detection, etc.). At step 304, the controller 110 polls the network for traffic management support information. The traffic management support information may include rules/algorithms stored in memory, e.g., 122, data storage devices 124, 126, etc., as described above with respect to FIG. 2.

At step 306, it is determined whether the network supports traffic management services. If so, the controller 110 subscribes to traffic management messages from the network at step 308. At step 310, the controller 110 reports its capabilities to the network. Capabilities may include, for example, a list of traffic control method(s) supported, algorithms supported, data format/structures/usages supported, version numbers, or information about subtended devices, as described further herein. At step 312, the controller 110 logs the status of the subscription to the network in its internal database and initiates traffic management services in accordance with the traffic messages at step 314. The traffic management services may include one or more of the processes disclosed in the aforementioned co-pending applications. If, however, the network does not support traffic management services at step 306, the controller implements default traffic management at step 316 as described above in FIG. 2.

Figure 4:
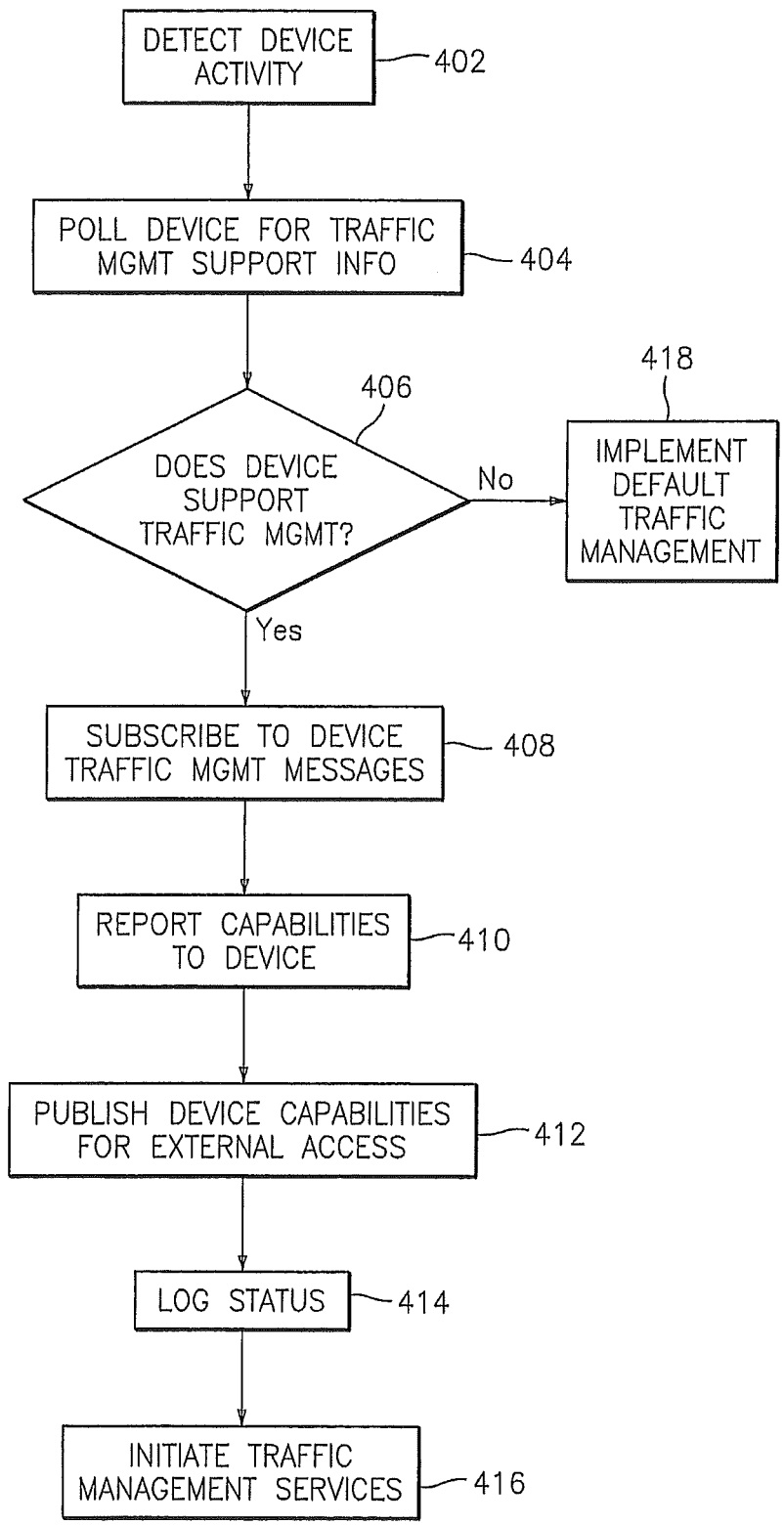
FIG. 4 a flow diagram describing a process for establishing and maintaining the traffic control system of FIGS. 1 and 2 with respect to a controller and a local area network in exemplary embodiments.

Turning now to FIG. 4, a process for establishing and maintaining the traffic control system with respect to a controller and one or more devices (e.g., 114-118) will now be described. At step 402, a device activity is detected by the controller 110. The activity may include powering up (or down) a device, logging in to a device, accessing an application via the device, receiving a signal from a presence detection device 118, etc. At step 404, the controller 110 polls the device for traffic management support information. In the presence detection example, the polling may be implemented for a device that is in close proximity of the presence detection device 118. The traffic management support information may include rules/algorithms stored, e.g., in one of devices 114 or 116. At step 406, it is determined whether the device supports traffic management services. If so, the controller 110 subscribes to traffic management messages from the device at step 408. At step 410, the controller 110 reports its capabilities to the device. At step 412, the controller 110 publishes device capabilities for external access. The externally accessible (i.e., published) device capabilities may be used by, e.g., a service provider or content provider to manage traffic and bandwidth utilization across its network. At step 414, the controller 110 logs the status of the subscription to the device in its internal database and initiates traffic management services in accordance with the traffic messages at step 416. If, however, the device does not support traffic management services at step 406, the controller 110 implements default traffic management at step 418 as described above in FIG. 2.

Figure 5:
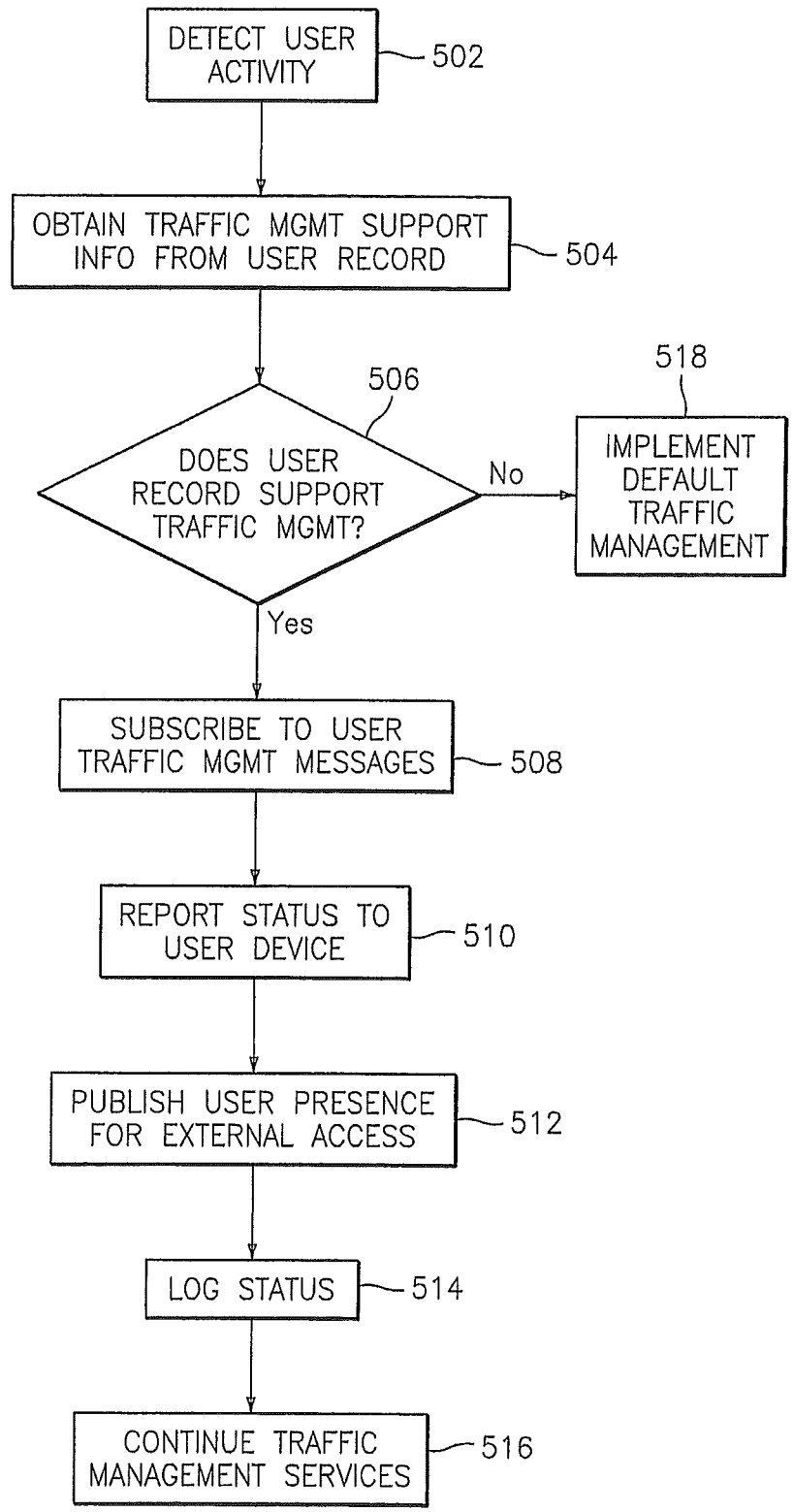
FIG. 5 is a flow diagram describing a process for establishing and maintaining the traffic control system of FIGS. 1 and 2 with respect to a controller and a user at a local area network in exemplary embodiments.

Turning now to FIG. 5, a process for establishing and maintaining the traffic control system with respect to a controller and a living object (e.g., a user of one of devices 114-118, an individual or pet that is present in customer premises 102, etc.) will now be described. At step 502, a user activity is detected by the controller 110. The activity may include the presence of the user near a device (e.g., via presence detection device 118), logging in to a device with a user ID that identifies a particular individual, accessing an application that identifies an individual via registration activities, etc., a signal received from a cellular telephone that is registered to an individual, etc.

At step 504, the controller 110 obtains traffic management support information from a user record associated with the user activity. The user record may be stored on one of devices 114 or 116. Alternatively, the user record may be stored in one of storage devices 124 and 126 if authorized by the user. At step 506, it is determined whether the user record supports traffic management services. If so, the controller 110 subscribes to traffic management messages from a device associated with the user at step 508. At step 510, the controller 110 reports its status to the user device. At step 512, the controller 110 publishes the user presence for external access. At step 514, the controller 110 logs the status of the subscription to the user in its internal database and initiates traffic management services in accordance with the traffic messages at step 516. If, however, the user record does not support traffic management services at step 506, the controller 110 implements default traffic management at step 518 as described above in FIG. 2.

Figure 6:
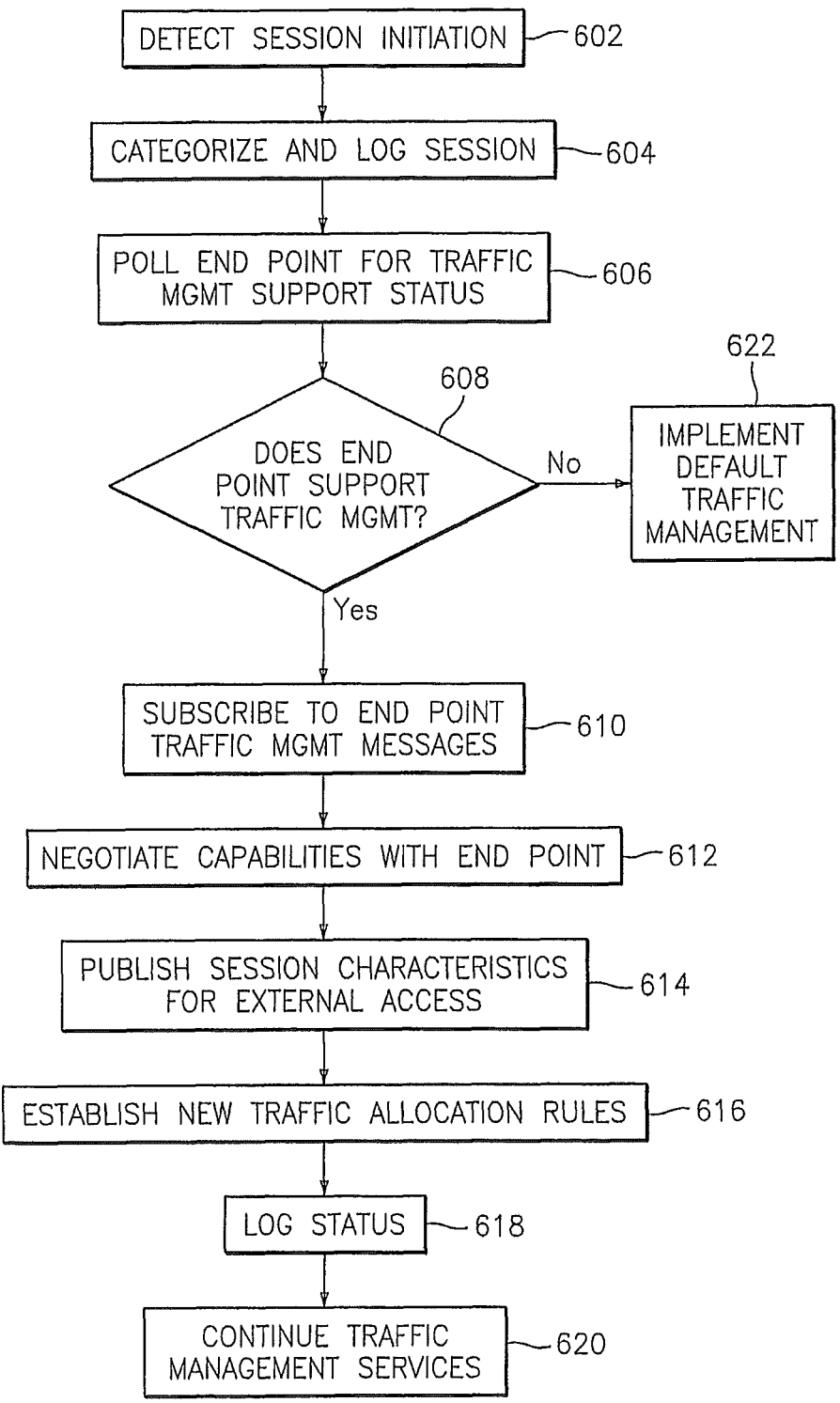
FIG. 6 is a flow diagram describing a process for establishing and maintaining the traffic control system of FIGS. 1 and 2 with respect to a controller and a traffic session in exemplary embodiments.

Turning now to FIG. 6, a process for establishing and maintaining the traffic control system with respect to a controller and a communications session (e.g., a television programming session, a file download, a video chat session, an electronic gaming session, etc.) will now be described. At step 602, a session initiation activity is detected by the controller 110. For example, a session initiation activity may include a user signing on to an application such as an instant messaging or video chat application. The act of signing on to the application may trigger a signal that is transmitted to controller 110 via the device upon which the application is executing. At step 604, the controller 110 categorizes and logs the session. This step is performed in order to identify and manage various types of sessions, many of which have differing transmission requirements (e.g., a video chat may require higher level resources than a file download). At step 606, the controller 110 polls an end point for traffic management support information. Traffic sessions require communication between two end points, one of which is on the controller side. The end point described herein refers to the location that is not on the controller side. For traffic sessions occurring between two locations, both of which contain a controller (e.g., video chat between two computers), the end point discussed herein refers to the location that did not initiate the session.

At step 608, it is determined whether the end point supports traffic management services. If so, the controller 110 subscribes to traffic management messages from the end point at step 610. At step 612, the controller 110 negotiates its capabilities with the end point. At step 614, the controller 110 publishes the session characteristics for external access. At step 616, the controller 110 establishes new traffic allocation rules. For example, if a controller at the end point does not provide allocation preferences, the controller 110 may implement traffic management services in accordance with messages received from devices within customer premises 102. However, if the controller at the end point does provide allocation preferences, then the controller 110 establishes new traffic allocation rules in accordance with negotiations conducted with the end point controller (in step 612). At step 618, the controller 110 logs the status of the subscription to the end point session in its internal database and initiates traffic management services in accordance with the traffic messages (and negotiated allocation) at step 620. If, however, the end point does not support traffic management at step 608, the controller 110 implements default traffic management at step 622 as described above in FIG. 2.

As described above, the exemplary embodiments can be implemented in the form of computer-implemented processes and apparatuses for practicing those processes. Exemplary embodiments can also be implemented in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. Exemplary embodiments can also be implemented in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method, comprising:
    detecting an occurrence of an activity via a computer processor, the activity subject to the detecting including a presence of a device;
    obtaining traffic management support information associated with a source of the activity and a destination of the activity, the traffic management support information comprising user-defined preferences for controlling traffic to the device;
    determining whether the source and the destination support traffic management activities;
    if the source and the destination support the traffic management activities, performing, via the computer processor:
    subscribing to traffic messages provided by the source; and
    implementing negotiating capabilities for the source and the destination based upon the traffic messages and the user-defined preferences;
    if the source and the destination do not support the traffic management activities, performing default traffic management activities via the computer processor; and
    reporting a status of the device.

2. The method of claim 1, further comprising:
    reporting capabilities of the device; and
    publishing the capabilities for external access.

3. The method of claim 1, wherein the activity subject to the detecting further includes a network presence, and the source is a network, the method further comprising reporting capabilities of the network.

4. The method of claim 1, wherein the activity subject to the detecting further includes a communication session, the method further comprising:
    negotiating capabilities of the communication session;
    publishing session characteristics for external access; and
    establishing traffic allocation rules.

5. The method of claim 1, further comprising:
    translating the traffic messages provided by the source.

6. The method of claim 1, wherein the detecting an occurrence of an activity further includes detecting a presence user of the device, the detecting the presence of the user performed by receiving sensor data indicating the presence via a sensor, the method further comprising publishing the presence of the user at the device responsive to receiving the sensor data.

7. The method of claim 6, wherein the sensor is a heat sensor.

8. The method of claim 6, wherein the sensor is a motion sensor.

9. A system, comprising:
    a controller including a computer processor; and
    computer program logic executing on the computer processor, the computer program logic implementing a method, comprising:
    detecting an occurrence of an activity, the activity subject to the detecting including a presence of a device;
    obtaining traffic management support information associated with a source of the activity and a destination of the activity, the traffic management support information comprising user-defined preferences for controlling traffic to the device, the source of the activity in communication with the controller;
    determining whether the source and the destination support traffic management activities;
    if the source and the destination support the traffic management activities, performing:

subscribing to traffic messages provided by the source; and implementing negotiating capabilities for the source and the destination based upon the traffic messages and the user-defined preferences; and if the source and the destination do not support the traffic management activities, performing default traffic management activities; and reporting a status of the device.

10. The system of claim 9, wherein the computer program logic further implements:

reporting capabilities of the device; and publishing the capabilities for external access.

11. The system of claim 9, wherein the activity subject to the detecting further includes a network presence, and the source is a network, the computer program logic further implementing:

reporting capabilities of the network.

12. The system of claim 9, wherein the activity subject to the detecting further includes a communication session, the computer program logic further implementing:

negotiating capabilities of the communication session;

publishing session characteristics for external access; and establishing traffic allocation rules.

13. The system of claim 9, wherein the computer program logic further implements:

translating the traffic messages provided by the source.

14. A non-transitory computer-readable storage medium encoded with computer executable code to perform a method, the method comprising:

detecting an occurrence of an activity, the activity subject to the detecting including a presence of a device;

obtaining traffic management support information associated with a source and a destination of the activity, the traffic management support information comprising user-defined preferences for controlling traffic to the device;

determining whether the source and the destination support traffic management activities;

if the source and the destination support the traffic management activities, performing:

subscribing to traffic messages provided by the source; and implementing negotiating capabilities for the source and the destination based upon the traffic messages and the user-defined preferences;

if the source and the destination do not support the traffic management activities, performing default traffic management activities; and reporting a status of the device.

15. The computer computer-readable storage medium of claim 14, wherein the activity subject to the detecting further includes a device presence, and the source further includes the device, the method further comprising:

reporting capabilities of the device; and publishing the capabilities for external access.

16. The computer computer-readable storage medium of claim 14, wherein the activity subject to the detecting further includes a network presence, and the source is a network, the method further comprising reporting capabilities of the network.

17. The computer computer-readable storage medium of claim 14, wherein the activity subject to the detecting further includes a communication session, the method further comprising:

negotiating capabilities of the communication session;

publishing session characteristics for external access; and establishing traffic allocation rules.

* * * * *